US012243161B2

(12) United States Patent
Treadway et al.

(10) Patent No.: US 12,243,161 B2
(45) Date of Patent: Mar. 4, 2025

(54) USER INTERFACE

(71) Applicant: Sphere Research Ltd, London (GB)

(72) Inventors: Oliver Treadway, London (GB); Martin Ling, London (GB)

(73) Assignee: Sphere Research Ltd, London (GB)

( * ) Notice: Subject to any disclaimer, the term of this patent is extended or adjusted under 35 U.S.C. 154(b) by 133 days.

(21) Appl. No.: 18/088,248

(22) Filed: Dec. 23, 2022

(65) Prior Publication Data

US 2023/0126214 A1  Apr. 27, 2023

Related U.S. Application Data

(63) Continuation of application No. PCT/EP2021/068090, filed on Jun. 30, 2021.

(30) Foreign Application Priority Data

Jun. 30, 2020 (GB) .................................... 2010022

(51) Int. Cl.
G06T 7/00 (2017.01)
G06T 7/11 (2017.01)
(Continued)

(52) U.S. Cl.
CPC ................ *G06T 17/00* (2013.01); *G06T 7/11* (2017.01); *G06T 7/64* (2017.01); *G06T 7/70* (2017.01);
(Continued)

(58) Field of Classification Search
CPC .................................................... G06T 15/20
See application file for complete search history.

(56) References Cited

U.S. PATENT DOCUMENTS 10,614,616 B1   4/2020  Tedesco et al.
2001/0028369 A1*  10/2001  Gallo .................. G06F 3/04815
                                              715/848

(Continued)

FOREIGN PATENT DOCUMENTS

WO    2011151367 A1   12/2011

OTHER PUBLICATIONS

"Anonymous: ""Perspective distortion (photography)— Wikipedia"", Jun. 28, 2019 (Jun. 28, 2019), XP05585014".

(Continued)

*Primary Examiner* — Martin Mushambo
(74) *Attorney, Agent, or Firm* — EIP US LLP

(57) ABSTRACT

A method of generating a user interface includes obtaining input data indicative of respective positions of a plurality of elements within an input plane and generating a model of a surface of a three-dimensional structure. The surface has circular symmetry and includes two curved polar caps and a curved equatorial belt, wherein a curvature of each of the polar caps is greater than a curvature of the equatorial belt. The method includes mapping the elements to respective positions on the model, and determining a position and orientation of a virtual camera, wherein the determined position of the virtual camera is exterior to the model. The method includes determining a field of view of the virtual camera containing a concave interior portion of the model, and rendering a projection of the model corresponding to the determined field of view and comprising elements mapped to positions on the concave interior portion.

19 Claims, 10 Drawing Sheets

(51) Int. Cl.
  *G06T 7/64* (2017.01)
  *G06T 7/70* (2017.01)
  *G06T 17/00* (2006.01)
  *H04N 23/69* (2023.01)
  *H04N 23/695* (2023.01)

(52) U.S. Cl.
  CPC .......... *H04N 23/69* (2023.01); *H04N 23/695* (2023.01); *G06T 2207/20101* (2013.01)

(56) References Cited

U.S. PATENT DOCUMENTS

| | | | |
|---|---|---|---|
| 2001/0048433 A1* | 12/2001 | Rubin | G06F 30/18 345/418 |
| 2008/0013860 A1* | 1/2008 | Blanco | G06F 8/38 382/311 |
| 2019/0258072 A1 | 8/2019 | Youngstrom et al. | |
| 2020/0104030 A1 | 4/2020 | Dedual et al. | |

OTHER PUBLICATIONS

"Pierce et al: ""Image Plane Interaction Techniques in 3D Immersive Environments""",Apr. 29, 1999 (Apr. 29, 1999), XP055850422".
International Search Report and Written Opinion dated Dec. 13, 2021 for PCT Application No. PCT/EP2021/068090.
Combined Search and Examination Report dated Jan. 6, 2021 for GB Application No. GB2010022.8.

\* cited by examiner

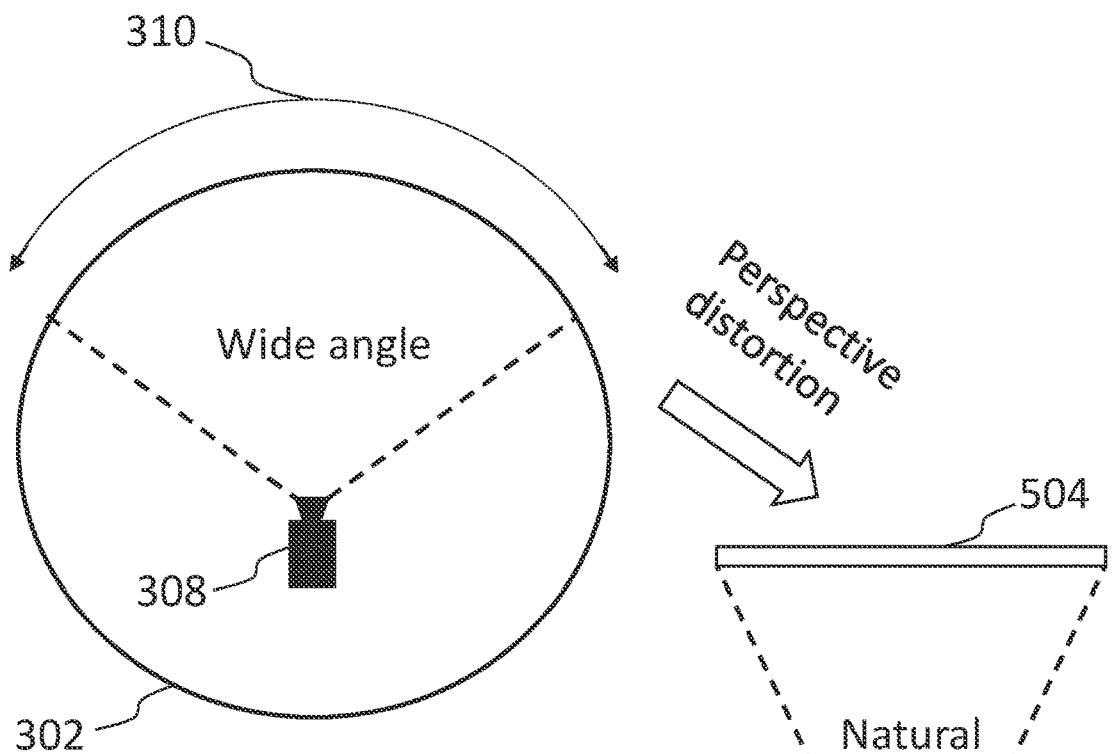
Fig. 5A
Fig. 5B
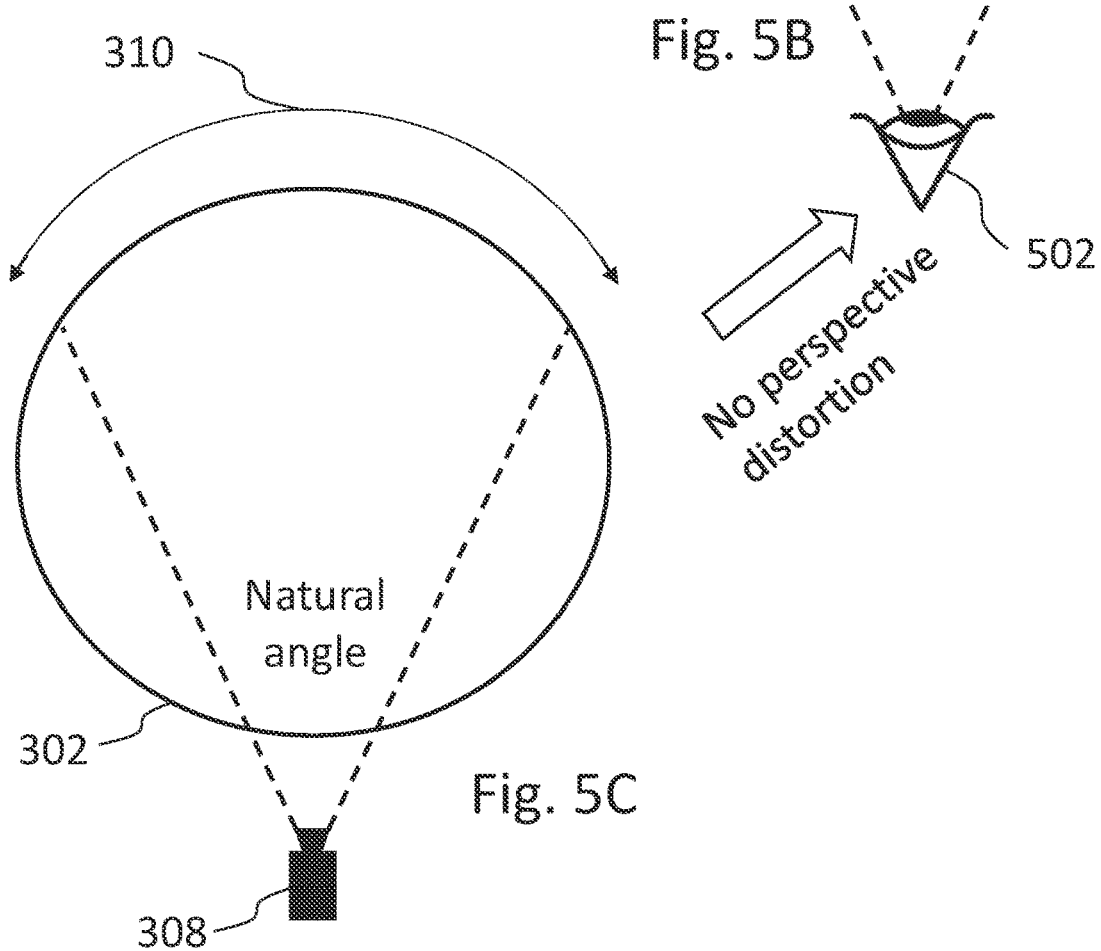
Fig. 5C

USER INTERFACE

CROSS-REFERENCE TO RELATED APPLICATIONS

This application is a continuation under 35 U.S.C. § 120 of International Application No. PCT/EP2021/068090, filed Jun. 30, 2021, which claims priority to GB Application No. GB2010022.8, filed Jun. 30, 2020, under 35 U.S.C. § 119(a). Each of the above-referenced patent applications is incorporated by reference in its entirety.

BACKGROUND

Technical Field

Embodiments disclosed herein relate to the generating of a user interface for display by a display device.

Background

Electronic devices such as computers, tablets, smart TVs and smartphones typically use a graphical user interface (GUI) to display information to a user and to facilitate interaction between the user and the device. Many GUIs, for example those provided as part of an operating system of a computer, are based on hierarchically-driven menus. It has been observed that for certain applications, GUIs based on hierarchically-driven menus are not intuitive and can be difficult to navigate through for the purposes of finding a particular item of interest. An alternative to hierarchically-driven menus is a GUI in which objects are presented on a surface of a three-dimensional structure. An example of such a GUI is discussed in international patent publication WO 2011/151367 A1, in which objects are presented on a curved interior surface of a hollow three-dimensional structure such as a sphere. The user is provided with controls to rotate the three-dimensional structure and to zoom into the surface, in order to view objects on different portions of the surface. In this way, more objects of a given size can be displayed on screen than is possible if the items are presented in a conventional two-dimensional GUI, and the controls provided make it easier and more intuitive for a user to locate and interact with the items than when using a conventional two-dimensional GUI.

Despite the advantages mentioned above, GUIs in which objects are presented on a surface of a three-dimensional structure are not commonplace. It is likely that this is at least partly due to various problems associated with the realisation of such a GUI. In particular, objects appearing on certain regions of a curved surface appear distorted when the surface is projected onto a two-dimensional display for viewing. For example, when objects are presented on an interior surface of a sphere, a distortion effect referred to as pin-cushioning occurs everywhere except in a small central region of the display. The greatest degree of distortion occurs at peripheral regions of the display, particularly those towards the left and right hand edges of the display if the display has a wide-screen aspect ratio. The distortion results in the curvature of horizontal lines other than those lying in a narrow equator region, which is particularly unfavourable for many applications of GUIs, for example in which a user wishes to select a set of items positioned in a line, or to read lines of text mapped to the surface. Furthermore, the apparent curvature of the surface caused by the projection does not accurately represent that which would be perceived by a person viewing a physical three-dimensional structure from the location of the user. This so-called perspective distortion can lead to undesired effects for the user such as discomfort and nausea when the user views and interacts with the GUI for an extended period of time. The distortion thus has a detrimental effect on the functionality and usability of the GUI.

SUMMARY

According to an aspect of the present disclosure, there is provided a computer-implemented method of, a system for, and a computer readable medium comprising a set of instructions for, generating a user interface for display by a display device.

The method includes obtaining input data indicative of a respective position of each of a plurality of elements within an input plane, and generating a model of a surface of a three-dimensional structure. The surface of the three-dimensional structure has circular symmetry about an axis passing through two poles and comprises two curved polar caps and a curved equatorial belt connecting the two polar caps, wherein each of the curved polar caps contains a respective one of the poles and a cross-sectional curvature of each of the polar caps in a plane containing the axis is greater than a cross-sectional curvature of the equatorial belt in the plane containing the axis. The method further includes mapping the positions of the plurality of elements within the input plane to respective positions on the generated model and determining a position and orientation of a virtual camera relative to the generated model. The determined position of the virtual camera is exterior to the generated model. The method includes determining a field of view of the virtual camera in dependence on the determined position and orientation of the virtual camera, the field of view containing a concave interior portion of the generated model, and rendering, in the user interface, a projection of the generated model, the projection corresponding to the determined field of view of the virtual camera and comprising a subset of the plurality of elements mapped to positions on the concave interior portion of the generated model.

The geometry of the surface and the position and orientation of the virtual camera together reduce the detrimental effects of distortion discussed in the background section. The surface is an example of a manifold, meaning that the surface contains no kinks or discontinuities, such that any region of the surface appears to be flat and planar if viewed from a position close enough to the surface. By providing a cross-sectional curvature of the polar caps that is greater than the cross-sectional curvature of the equatorial belt, the pin-cushioning effect towards the periphery of the display is reduced, since straight lines positioned away from the centre of the display appear less curved. Furthermore, a region in which the pin-cushioning effect is minimised is extended in the vertical direction. Positioning the virtual camera exterior to the model allows a greater proportion of the interior of the generated model to be included within the field of view of the virtual camera than if the virtual camera were positioned inside the model, without widening the field of view in a way that would introduce perspective distortion. In this way, the apparent curvature of the surface induced by the position and orientation of the virtual camera more accurately reflects that of a physical three-dimensional structure viewed from the physical location of the user's eyes, which mitigates the feelings of nausea and discomfort mentioned above.

In an example, the determined orientation of the virtual camera is such that the two poles comprise an upper pole and a lower pole with respect to the determined orientation, and the determined position of the virtual camera is closer to the upper pole than to the lower pole.

By positioning the virtual camera closer to the upper pole than to the lower pole, such that the virtual camera faces downwards towards the centreline of the model, the extended region of minimum distortion is rendered above a horizontal centreline of the display. In a typical configuration, it is normal for a user's eyeline to be aligned with a region above the centreline of the display, such that the user looks horizontally towards the upper region of the display and downwards towards a lower region of the display. By positioning the virtual camera nearer the upper pole, the region of minimum distortion can be optimally positioned for the user to view and interact with objects appearing in the undistorted portion of the user interface. Additionally, any feelings of nausea and discomfort are further reduced because the virtual camera is positioned in correspondence with the physical location of the user's eyes.

Further features and advantages of the disclosure will become apparent from the following description of preferred embodiments described herein, given by way of example only, which is made with reference to the accompanying drawings.

BRIEF DESCRIPTION OF THE DRAWINGS

FIGS. 5A-5C are schematic diagrams illustrating the effect of perspective distortion when an interior surface of a structure is projected from two different virtual camera positions;

DETAILED DESCRIPTION

Figure 1:
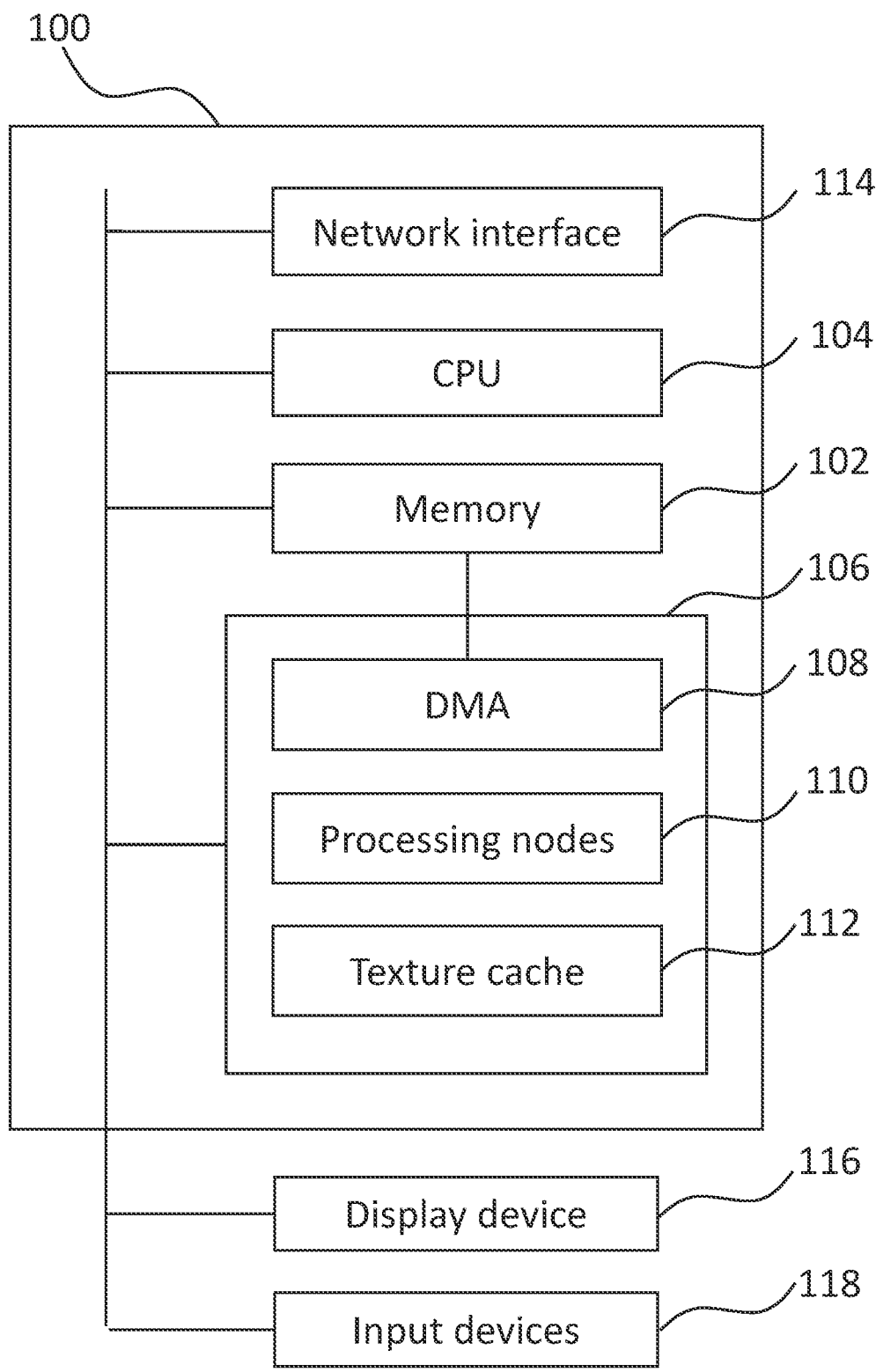
FIG. 1 shows an example of a computing system arranged to generate a user interface.

Embodiments of the present disclosure relate to the generating of a user interface for display by a display device. In particular, embodiments described herein address challenges relating to the rendering of visual information on a surface of a three-dimensional structure, particularly when the visual information is representative of items with associated functional attributes. FIG. 1 shows an example of a computing system 100 suitable for generating a user interface. The computing system 100 in this example includes memory circuitry 102 and processing circuitry, where the processing circuitry includes a central processing unit (CPU) 104 and a graphics processing unit (GPU) 106. The CPU 104 is configured to execute machine-readable instructions stored by the memory circuitry 104, and the GPU 106 is configured to render three-dimensional scenes in accordance with instructions generated by the CPU 104. In order to facilitate fast rendering of three-dimensional scenes, the GPU 106 includes a direct memory access (DMA) 108 for reading data from the memory 102 without the need for explicit instructions from the CPU 104. The GPU 106 may further include multiple processing cores 110 for performing, in parallel, the necessary computations to render a given scene. For example, when a three-dimensional scene is based on a model comprising a set of connected polygons, each of the processing cores 110 may be allocated the task of rendering a respective subset of the set of connected polygons. The GPU 106 may further include a cache 112 which can store relatively small volumes of rasterised image data for rapid access by the processing cores 110 during rendering.

The memory circuitry 102 in this example includes non-volatile storage along with working memory such as random-access memory (RAM) including static random-access memory (SRAM), dynamic random-access memory (DRAM) and synchronous dynamic random-access memory (SDRAM).

The computing device 100 includes a network interface 114 for communicating with remote devices such as server systems or other user devices over a network such as the Internet. For certain applications, the computing device 100 is used to generate a GUI based on data received from a remote server system, for example web resources accessed using a web browser or dedicated software application.

The computing system 100 is connected to a display device 116, which in this example is a planar flat-screen display, though in other examples could be a curved display, a projector, a display of a virtual reality headset or an augmented reality headset, or any other device suitable for displaying a user interface for viewing by a user of the computing system 100. The display device 116 in this example is connected to the computing device 100 by wired means, but in alternative embodiments a display device could be connected wirelessly to a computing device or could be integral to a computing device, for example in the case of a laptop computer, tablet computer or smartphone.

The computing system 100 is further connected to input devices 118 for receiving user input from a human user. At least one of the input devices 118 is arranged to receive user input indicating an input location on the display device 116. Examples of such input devices include a mouse, a trackpad, a touch-screen input, a front-facing camera or other motion detection device to facilitate gesture recognition, and eye-tracking sensors for determining which portion of the display device 116 the user is looking at.

Figure 2:
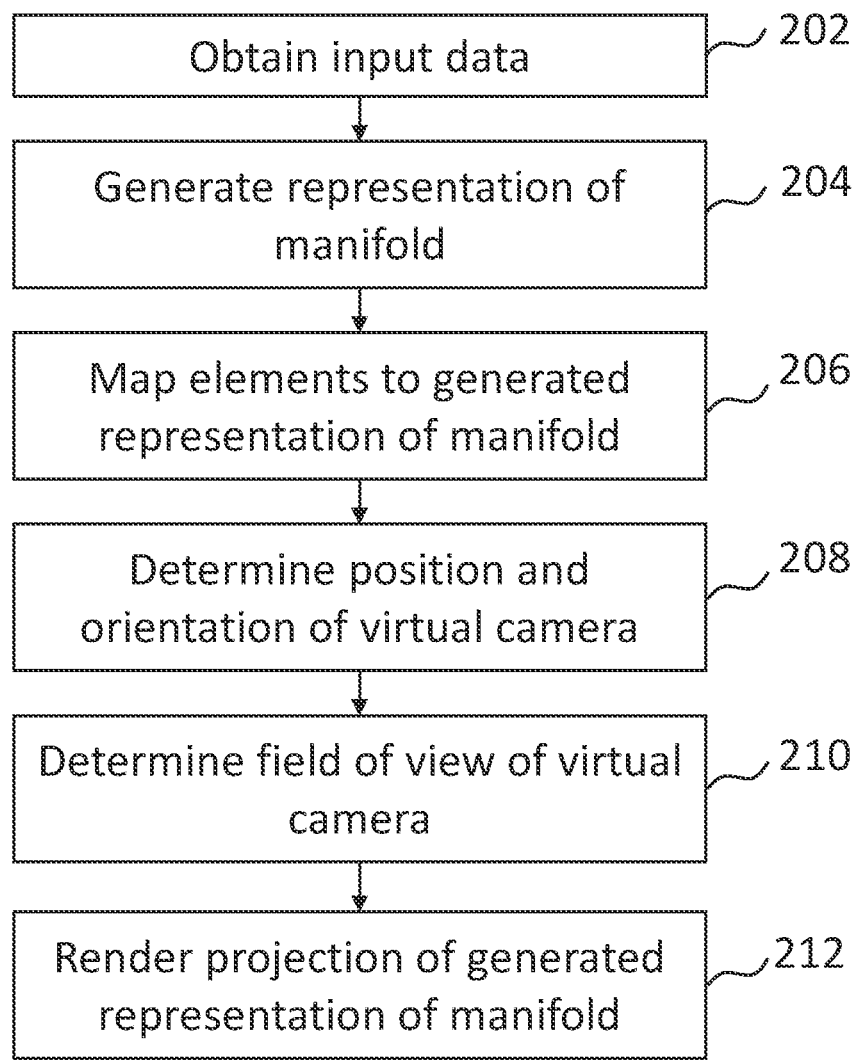
FIG. 2 is a flow chart representing a method performed by the computing system of FIG. 1 to generate a user interface in accordance with examples.
Figure 3:
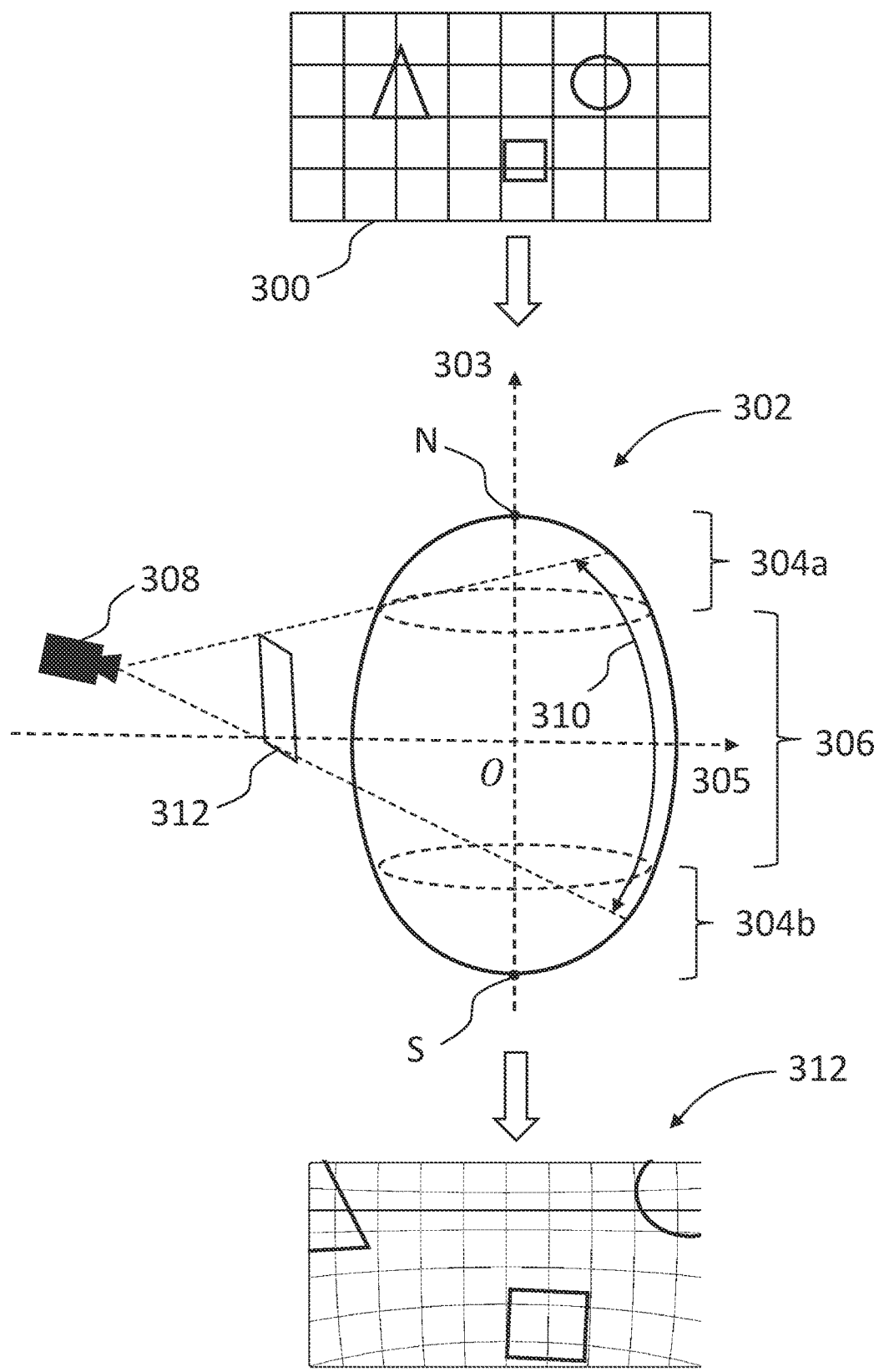
FIG. 3 shows schematically an example of a GUI being generated in which objects are displayed on a surface of a three-dimensional structure.

FIG. 2 shows an example of a method implemented by the computing system 100 for generating a user interface for display by a display device. The computing device 100 obtains, at 202, input data indicative of a respective position of each of a set of elements within an input plane. The elements may include pixel values of one or more rasterised images positioned within the input plane, and/or elements defined in a vector graphics format for defining geometries, colours and other visual aspects of objects positioned within the input plane. FIG. 3 shows an example of an input plane 300 containing a simple image including exemplary elements such as a triangle, a square and a circle. An orthonormal grid, which is not part of the image, is overlaid on the input plane 300 to represent the underlying geometry of the input plane. In this example, the input plane 300 has an aspect ratio of 2:1, which is the aspect ratio typically used for images in spherical photography, though other aspect ratios of input plane may be used without departing from the scope of the disclosure.

In the present example, the input data obtained at 202 further includes functional data associating functional attributes with at least a portion of the elements in the input plane 300. The functional attributes can either be linked directly to elements within the input plane or can alternatively be associated with locations in the input plane, for example using co-ordinates or pixel indices. The functional attributes govern the interactive behaviour of the elements, for example by providing navigation information to files or other data items, along with instructions specifying processing routines to be performed when one of the elements is activated in response to user input. Processing routines can include, for example, opening a file, displaying an image, playing a video or audio file, initiating a script or code fragment, or modifying one or more aspects of the user interface. In a specific example, the elements in the input plane 300 represent files within a file structure, and the functional attributes include information for locating the files along with instructions to open or preview a located file, depending on a type of user input received. In some examples, the functional data may be arranged such that multiple sets of functional attributes are associated with the elements, each set being associated with a particular configuration of the user interface. Specific examples will be described hereinafter.

For certain applications, the input data obtained at 202 is generated remotely and received via the network interface 118 of the computing device 100. An example of such an application is where a user interface is generated within a web browser in order for a user to interact with resources provided by a web server. For other applications, input data may be generated locally at the computing device 100, for example where the user interface is used to view files within a file structure local to the computing device 100. Depending on the application, the input data may be generated manually by a human designer using appropriate graphics design software, or otherwise may be generated in a partially or completely automated manner, for example using a software component which automatically positions a set of items relative to one another in accordance with a predetermined set of rules or using techniques such as machine learning, clustering, or pattern recognition.

The computing system 100 generates, at 204, a model of a surface of a three-dimensional structure for rendering in the user interface. The model in this example is a polygon mesh, which is formed of a set of connected polygons arranged to represent the surface of the three-dimensional structure. A range of software libraries exist for generating a polygon mesh to represent a given geometrical structure, for example those defined in the Three.js JavaScript™ library or those used in the MeshLab™ software suite. In present example, the polygons of the model are triangles. Triangles can be used to generate a model of any surface and have the advantage that GPUs are typically optimised to perform computations based on triangles rather than other types of polygon, resulting in improved efficiency and speed of rendering.

In an example in which the user interface is presented within a web browser, the mesh representation of the surface is generated and rendered within a <canvas> element of an html5 web page using the Three.js JavaScript application programming interface (API). The Three.js API has been developed specifically for generating animated three-dimensional graphics for rendering by a web browser, and make uses of the lower-level Web Graphics Library™ (WebGL) API which enables GPU-accelerated graphics rendering as part of a <canvas> element of a web page. In other examples, a mesh representation of a surface may be rendered using a plug-in or a dedicated software application.

As mentioned above, the model generated at 204 represents a surface of a three-dimensional structure. The surface has a topology and smoothness such that any region of the surface appears locally planar. As will be explained in more detail hereafter, the surface has geometrical properties which mitigate certain undesired effects associated with the projecting of a three-dimensional structure into two dimensions.

An example of a surface 302 of a three-dimensional structure with a specific geometry is shown in FIG. 3. The surface 302 is a closed shell with circular symmetry about an axis 303 passing through two poles N and S in a virtual three-dimensional space. The surface 302 is formed of two curved polar caps 304a, 304b and a curved equatorial belt 306 connecting the two polar caps such that there is no discontinuity or kink at the boundaries between the polar caps 304a, 304b and the equatorial belt 306. The first polar cap 304a passes through the pole N and the second polar cap 304b passes through the pole S. Each of the polar caps 304a, 304b and the equatorial belt 306 has a cross-sectional curvature in a plane containing the axis 303 (for example, the plane containing the axis 303 and the axis 305 shown in FIG. 3), where the cross-sectional curvature of each of the polar caps is greater than the cross-sectional curvature of the equatorial belt. In this example, the cross-sectional curvature of each of three components is constant, and the cross-sectional curvature of the first polar cap 304a is equal to the cross-sectional curvature of the second polar cap 304b. In other examples, two polar caps may have different curvatures from one another, and/or the cross-sectional curvature of one or more of the components of the surface may vary with position.

Figure 4:
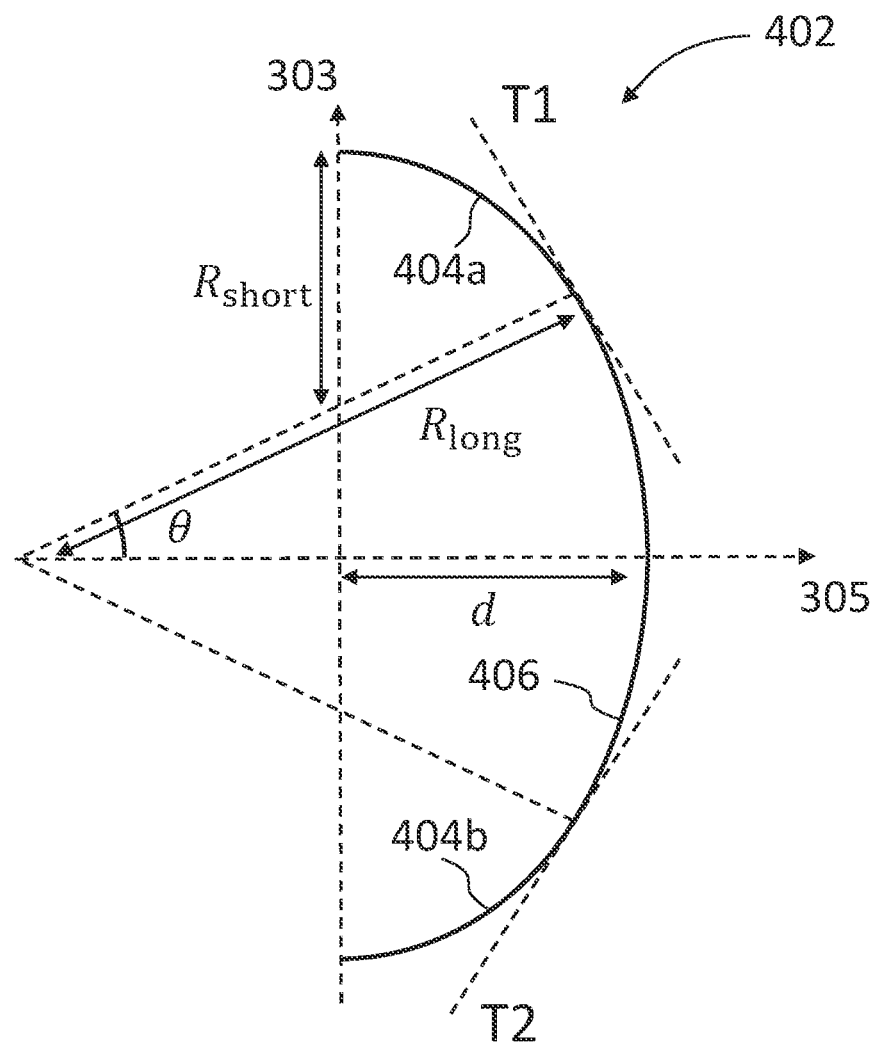
FIG. 4 shows a curve from which the surface shown in FIG. 3 is generated.

The circular symmetry of the surface 302 about the axis 303 means that the surface 302 can be generated as a surface of revolution of a curve about the axis 303. FIG. 4 shows a curve 402 from which the surface 302 of FIG. 3 is generated. In this example, the curve 402 has reflective symmetry about the axis x and is formed of three contiguous circular arcs 404a, 406, 404b. The arc 406 is smoothly joined smoothly to each of the arcs 404a, 404b, such that the arcs 406 and 404a share a tangent T1 and the arcs 406 and 404b share a tangent T2. Rotation of the arcs 404a, 404b about the axis 303 forms the polar caps 304a, 304b, whereas rotation of the arc 406 about the axis 303 forms the equatorial belt 306. The radius $R_{long}$ of the arc 406 is greater than the radius $R_{short}$ of each of the arcs 404a, 404b, resulting in each of the polar caps 304a, 304b having greater cross-sectional curvature than that of the equatorial belt 306. The shape of the curve 402, and the resulting shape of the surface 302, is specified by any three of the following set of interdependent parameters:

the radius $R_{long}$ of the circular arc 406;
the radius $R_{short}$ of the circular arcs 404a, 404b;
the maximum distance d of the circular arc 406 from the axis 303 (which defines the maximum radius of the surface in a plane perpendicular to the axis 303); and
the angle θ subtended by half of the circular arc 406.

Due to scale invariance, any one of the length parameters can be set to a fixed value, and only two further parameters are then required to specify the shape of the surface 302. Different sets of values for the parameters may be suitable for different applications. For example, where the user interface is to be used for displaying documents, a small value of d may be chosen compared with the radius $R_{long}$ in order to minimise the curvature of the equatorial belt. Optionally, a large value of the angle θ can also be chosen in order for the equatorial belt 306 to have a large vertical extent. Suitable sets of parameter values for a wide range of applications lie within the ranges $2d \leq R_{long} \leq 4d$ and 5 radians $\leq \theta \leq 20$ radians. An exemplary set of parameters suitable for a range of applications is found to be given by d=375, $R_{long}$=1000, θ=12.5 radians.

The computing system 100 maps, at 206, the positions of the elements in the input plane to respective positions on the model of the surface 302. In this example, UV mapping techniques are used to generate mapping information relating the positions of elements in the input plane to vertices of the triangles forming the model. The GPU 106 uses this mapping information to determine how to "paint" the elements onto the triangles oriented in three-dimensions during real-time rendering of the user interface. In other examples, alternative mapping techniques could be used, such as projection mapping in which the positions of the elements are mapped directly to three-dimensional co-ordinates. In an example where the elements are defined in a vector graphics format, positions of the elements can be mapped directly to three-dimensional co-ordinates.

The computing system 100 determines, at 208, a position and orientation of a virtual camera 308 with respect to the model of the surface 302. The determined position and orientation of the virtual camera 308 are parameters of the user interface which may be set in advance of the generation of the user interface. Although the virtual camera 308 can subsequently be moved, for example in response to user input indicating a request to zoom into a certain portion of the surface 302, a default position and orientation are preferably determined which have advantageous properties as will be explained in more detail hereafter. The virtual camera 308 acts defines a frame of reference from which the surface 302 appears to be viewed when displayed on the user interface. The position of the virtual camera 308 is defined in three dimensions with respect to a co-ordinate system fixed relative to the model of the surface 302, though an equivalent arrangement can be achieved by defining a co-ordinate system with respect to the virtual camera 308 and positioning the model relative to that co-ordinate system. The orientation of the virtual camera 308 can be specified using three parameters, for example three Euler angles defining rotations about three orthogonal axes, relative to a predetermined default orientation. In this case, the three angles represent the pitch, roll and yaw of the virtual camera 308 with respect to the fixed co-ordinate system. In other implementations, an orientation of the model of the surface 302 may be specified relative to a co-ordinate system in which the virtual camera 308 is fixed.

As shown in FIG. 3, the virtual camera 308 is oriented such that the pole N is an upper pole and the pole S is a lower pole with respect to the orientation of the virtual camera 308. In other words, when viewed from the frame of reference of the virtual camera 308, the pole N appears substantially above the pole S. In the present example, the roll of the virtual camera 308 with respect to the axis 303 is zero, such that the camera 308 does not lean sideways with respect to the axis 303. The virtual camera 308 in this example is positioned closer to the upper pole N than to the lower pole S, and has a negative pitch such that the virtual camera 308 faces downwards towards a concave interior portion 310 of the model of the surface 302. In other examples, the virtual camera 308 could be positioned closer to the lower pole S than to the upper pole N, or could be equidistant from the two poles. Positioning the virtual camera 308 closer to the lower pole S may be favourable, for example, where the user interface is used to present a scene which is typically viewed from below, such as a sky scene, in which case the virtual camera 308 may be oriented to face upwards towards a concave interior portion of the model.

The computing system 100 determines, at 210, a field of view of the virtual camera 308 in dependence on the position and orientation of the virtual camera 308. The field of view defines an angular extent in the horizontal and vertical directions of a region that can be viewed by the virtual camera 308. The field of view depends on the position and orientation of the virtual camera 308, and further depends on angular dimensions of the field of view in the horizontal and vertical directions (or, alternatively, in a diagonal direction if the aspect of the field of view is fixed).

The computing system 100 renders, at 212, a projection of the model of the surface 302 in the user interface. The projection corresponds to the determined field of view of the virtual camera 308 and includes a subset of the elements mapped from the input plane to positions on the concave interior portion 310 of the model. The projection includes a portion of the model projected onto a display plane 312 from the perspective of the virtual camera 308. The display plane 312 corresponds to the two-dimensional display on which the user interface is rendered. In the example of FIG. 3, the virtual camera 308 is positioned exterior to the model of the surface 302. Elements mapped to a convex exterior portion of the model lying between the virtual camera 308 and the interior portion 310 are excluded from being rendered, giving the impression that the virtual camera 308 is positioned inside the closed shell of the surface 302. Positioning the virtual camera 308 exterior to the model allows a greater proportion of the model to be included within the field of view of the virtual camera 308 than if the virtual camera 308 were positioned inside the model. This compensates for the stretching effect produced by the reduced curvature of the equatorial belt 306, without requiring very large angular dimensions of the field of view of the virtual camera 308, which would otherwise result in a high degree of perspective distortion that may contribute to feelings of discomfort or nausea for the user.

FIGS. 5A-C illustrate the effects of the positioning the virtual camera 308 interior to the surface 302 and exterior to the surface 302 when rendering a projection of the surface 302 corresponding to the interior portion 310. As shown in FIG. 5A, positioning the virtual camera 308 interior to the surface 302 results in a comparatively wide viewing angle being required to span the interior portion 310. This wide angle does not match the viewing angle of the naked eye of the user 502 viewing the GUI on a display 504, as shown in FIG. 5B. This results in perspective distortion, which can result in feelings of nausea and discomfort when the user interacts with the GUI for an extended period of time. By contrast, positioning the virtual camera 308 exterior to the surface as shown in FIG. 5C enables a viewing angle to be selected that matches the viewing angle of the user 502. In this way, the discomfort experienced by the user 502 is reduced.

In the example of FIG. 3, during the generation of the model, each polygon is assigned parameters of a respective normal vector defining an outward-facing direction of the model. During rendering, polygons with outward-facing normal vectors facing in a substantially opposite direction to a target direction of the camera can be excluded from the projection. In other examples, certain polygons may be switched on or off as the user interacts with the user interface, either manually by the user or automatically, for example in dependence on a current zoom level. In an example, polygons corresponding to an exterior portion of the three-dimensional structure may initially be rendered, then when a user zooms towards the structure by a threshold zoom factor, the polygons corresponding to the exterior portion may be switched off and excluded from rendering such that polygons corresponding to an interior portion of the structure are rendered instead, giving the impression that the user has entered the three-dimensional structure.

The geometry of the surface 302 and the position and orientation of the virtual camera 308 in the present example have a synergistic effect to minimise the distortion of items appearing within the user interface. By providing that the cross-sectional curvature of the polar caps 304a, 304b is greater than the cross-sectional curvature of the equatorial belt 306, the distortion of objects appearing on a peripheral region of the display is minimised. In particular, the pincushioning effect towards the edges of the display is reduced such that straight lines positioned away from the centre of the display appear less curved.

Figure 6A:
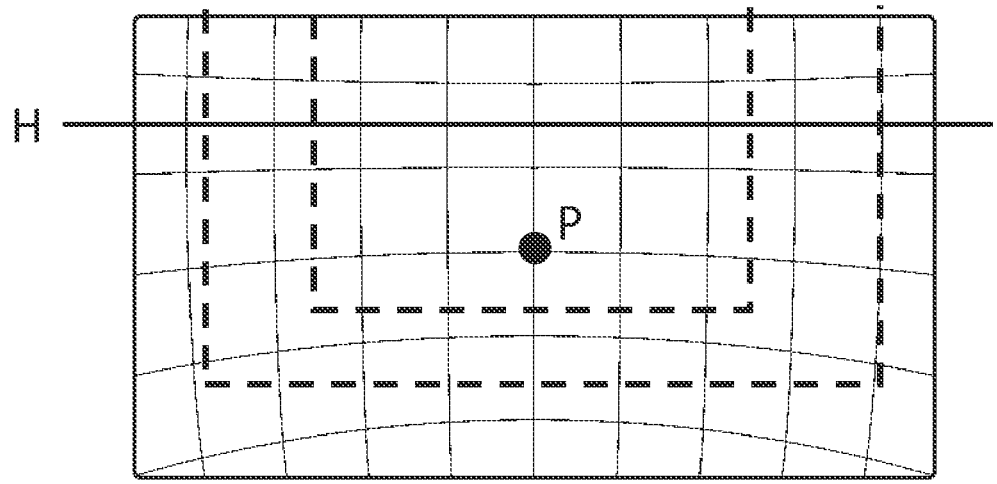
FIG. 6A shows distortion of an orthonormal grid when mapped onto the surface shown in FIG. 3.
Figure 6B:
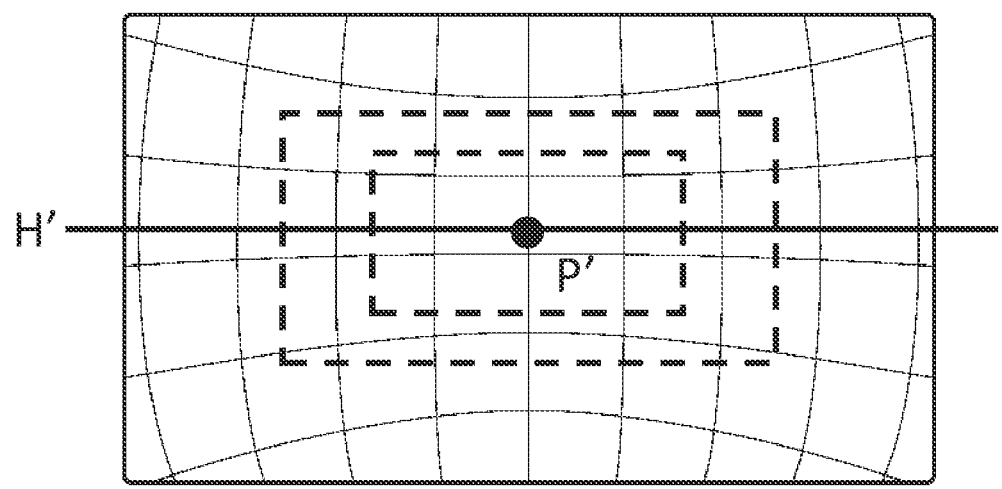
FIG. 6B shows distortion of an orthonormal grid when mapped onto a surface of a sphere.

By positioning the virtual camera 308 closer to the upper pole N than to the lower pole S of the surface 302, a region of zero distortion, in which horizontal lines appear straight, is located above the centreline of the display. The combination of the position and orientation of the virtual camera 308 with the geometry of the surface 302 thereby results in an extended region of low distortion is rendered above a centreline of the display. FIG. 6A shows an example of an orthonormal grid mapped from an input plane onto the surface 302, then projected onto a display in accordance with the determined position and orientation of the virtual camera 308 shown in FIGS. 1 and 4B. In this example, the virtual camera 308 faces directly towards a target point P on the generated representation of the surface 302, such that a projection of the target point P is rendered in the centre of the user interface. A horizontal line H positioned above the target point P appears exactly straight when projected onto the display plane. For comparison, FIG. 6B shows a grid mapped from an input plane onto an interior surface portion of a sphere, then projected onto a display plane from the perspective of a virtual camera positioned at the centre of the sphere. In this case, a horizontal line H' passing through the target point P' appears straight.

In FIG. 6B, horizontal lines other than those lying in a narrow equator region (around horizon line H') are significantly curved, which is unfavourable for many applications of GUIs, for example in which a user wishes to select a set of items positioned in a line, or to read lines of text mapped to the surface. In FIG. 6A, horizontal lines located away from the horizon line H are far closer to being straight than those located away from the horizon line H' in FIG. 6B. A similar reduction in curvature can be seen for the vertical lines. It is thus observed that the pin-cushioning effect, in which the straight horizontal and vertical grid lines appear curved, is less significant in FIG. 6A.

The concentric dashed boxes of FIGS. 6A and 6B delimit regions of comparably low, medium and high distortion (with low distortion inside the inner box, medium distortion between the inner and outer boxes, and high distortion outside the outer box). The regions of comparably low distortion are smaller in FIG. 6B, such that individual elements (for example, rasterised images) projected onto the surface in FIG. 6A will be significantly distorted everywhere except in a small central region of the display. The regions of comparably low distortion are larger in FIG. 6A, in particular being extended in the vertical direction, meaning that individual elements projected onto the display will be less distorted. The resulting projection is much more suitable for most applications of GUIs.

It is noted that, in FIG. 6A, the region of minimum distortion appears higher up within the user interface than in FIG. 6B. In a typical configuration, it is normal for a user's eyeline to be aligned with a region above the centreline of the display, such that the user looks horizontally towards the upper region of the display and downwards towards a lower region of the display. By positioning the virtual camera nearer the upper pole, the region of minimum distortion is therefore optimally positioned for the user to perform commonplace actions such as reading lines of text. Furthermore, the apparent curvature of the surface induced by the position and orientation of the virtual camera more accurately reflects that of a physical three-dimensional structure viewed from the physical position of the user's eyes, which mitigates unpleasant sensations such as nausea which are often reported by users viewing three-dimensional scenes on a two-dimensional display.

The computing device 100 displays the rendered projection of the model, along with the subset of elements mapped to positions within the interior portion 310 of the model, using the display device 108, allowing the user of the computing device 100 to view and interact with the displayed elements. As mentioned above, certain elements appearing within the rendered projection are associated with functional attributes which, when activated, cause the computing device 100 to perform respective processing routines. It is therefore important that the user can precisely select elements or locations within the generated representation of the surface 302, in order to activate the associated functions of those elements.

Input devices such as computer mice, touch pads, touchscreen displays, and certain types of gesture recognition device, allow a user to provide input specifying a point within a flat plane, but due to the distortion induced by the curved surface of the three-dimensional structure, it can be difficult for the user to directly specify an interaction location on the surface 302. In particular, when a user interface contains a large number of closely-packed items, a small error in determining an interaction location can have unintended consequences. The user may, for example, accidentally select an item adjacent to one that he or she intends to select.

Figure 7:
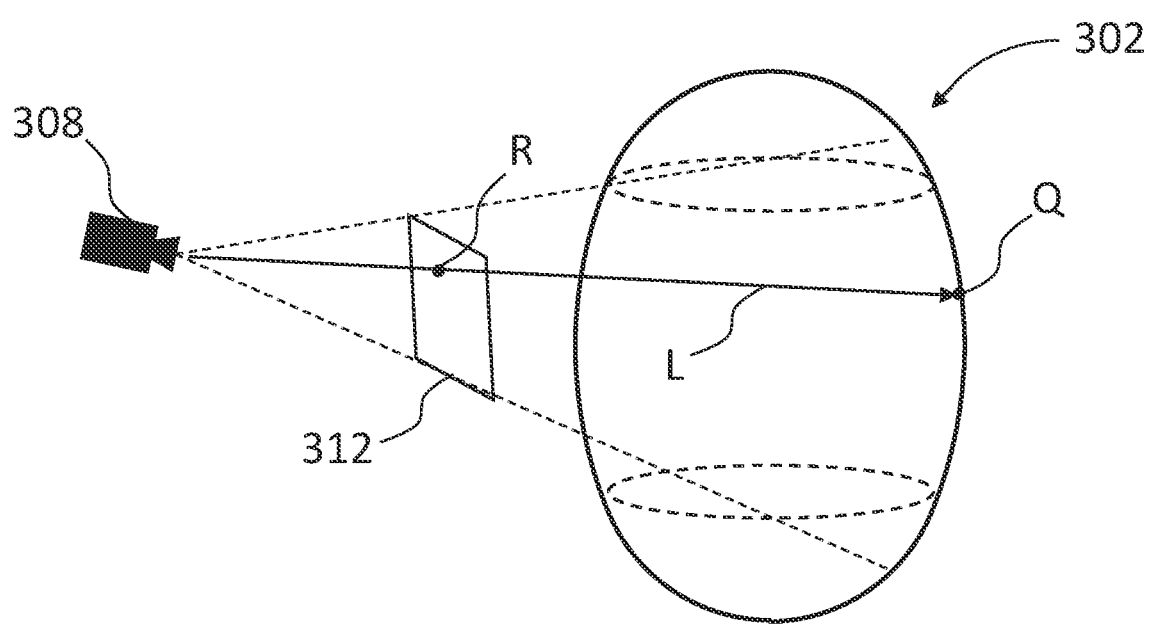
FIG. 7 shows an example of an input location in a user interface being projected to an interaction location on the surface shown in FIG. 3.

With embodiments described herein, when the computing system 100 receives user input via one of the input devices 118, an interaction location is determined with regards to a point on the surface of the three-dimensional structure. FIG. 7 shows an example in which the computing system 100 receives user input specifying an input location R in a display plane 312 to which the representation of the surface 302 is projected. The computing system 100 determines a corresponding interaction location on the model of the surface 302 of the three-dimensional structure, and performs a processing routine in accordance with a functional attribute of an element mapped to the interaction location. In order to determine the interaction location precisely and efficiently, the computing system 100 first determines parameters of a line in three-dimensions passing through the virtual camera in a direction that depends on the indicated input location. In the example of FIG. 7, a line L passes through the virtual camera 308 and the input location R in the display plane 312. An interaction location Q on the concave interior portion of the generated model is then determined as an intersection between the line L and the surface. In cases where the surface is formed of a composition of surface portions (referred to herein as primitives) defined using respective different equations, the interaction location Q is determined as an intersection between the line L and one of said primitives. In this way, determining the interaction location on the generated model is reduced to a calculation between a line with precisely-determined parameters and the surface having a precise mathematical definition. This computation can be performed at a low computational cost and to an arbitrary degree of precision. In some cases, the line L intersects with several of the primitives, possibly at several points, and the correct interaction location is determined from these several intersection points.

Figure 8A:
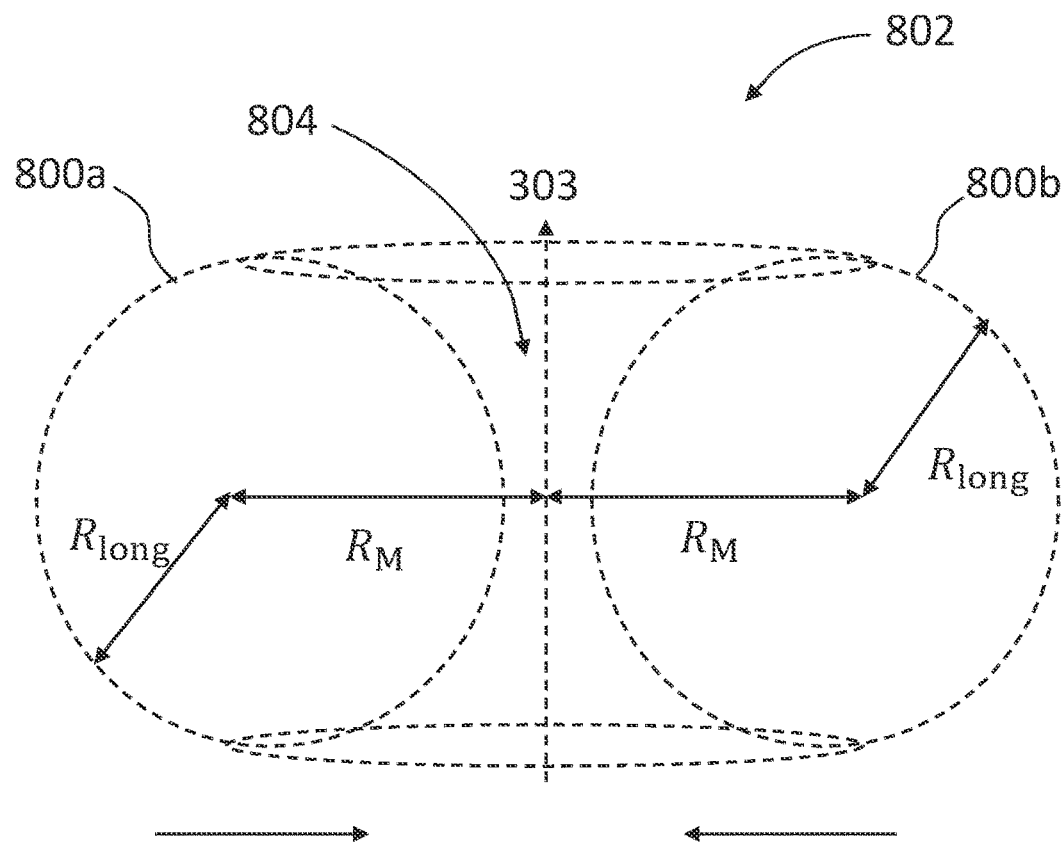
FIGS. 8A and 8B show a collapsing of a torus to generate a primitive portion of the surface shown in FIG. 3.
Figure 8B:
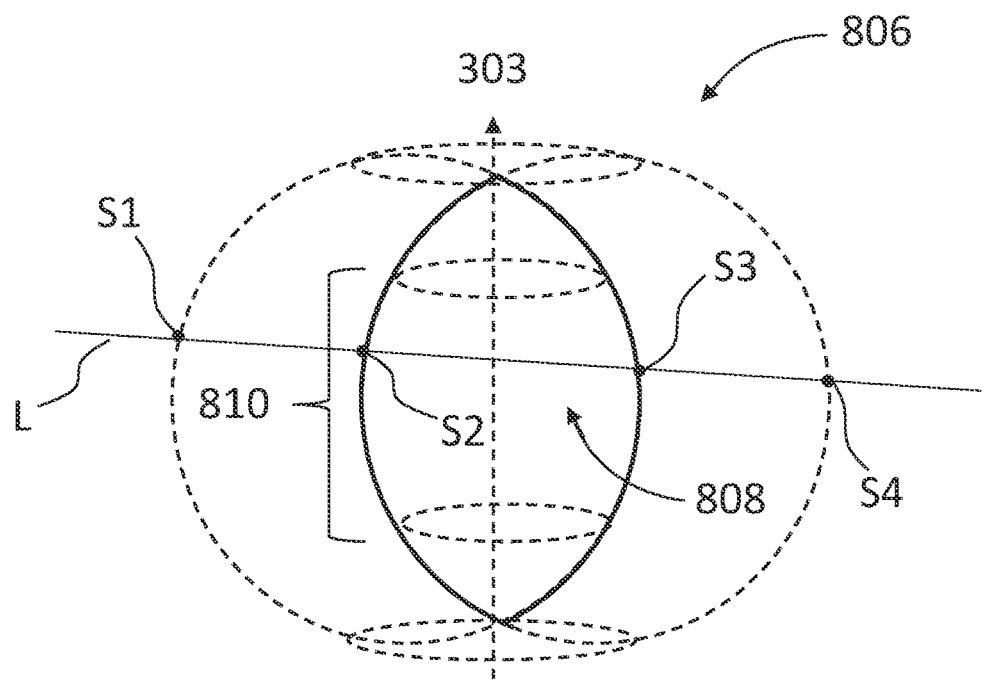

For the surface 302 shown in FIG. 3, each of the polar caps 304a, 304b is a portion of a sphere, and therefore determining an interaction location on the representation of either polar cap 304a, 304b involves determining an intersection between a line and a primitive which is a spherical surface, resulting in a quadratic equation with two solutions, one of which corresponds to the interaction location. The equatorial belt is formed from a different primitive, which in one example comprises a surface of a self-intersecting spindle torus, also known as a degenerate toroidal surface. FIG. 8A shows two circles 800a, 800b of radius $R_{long}$ with centres separated by a distance $2R_M$. The two circles 800a, 800b form a cross-section of a torus 802 with a major radius $R_M$ and a minor axis $R_{long}$, where $R_M > R_{long}$ such that the torus 802 is donut-shaped and contains a hole 804 centred on an axis 303 of rotational symmetry. As the value of $R_M$ is reduced, the size of the hole becomes smaller until $R_M < R_{long}$, after which the hole 804 disappears when the circles 800a, 800b partially overlap with one another. The torus 806 resulting from rotation of the partially overlapping circles 800a, 800b about the axis 303 has an overlapped or degenerate portion 808 as shown between the two intersecting solid curves in FIG. 8B. The equatorial belt 306 of the surface 302 has an identical geometry to a section 810 of a surface of the overlapped portion 808 of the degenerate torus 806. Determining an interaction location on the equatorial belt 306 therefore involves determining an intersection between a line and the degenerate toroidal primitive, resulting in a quartic equation with four solutions, one of which corresponds to the interaction location. In the example of FIG. 8B, the interaction location Q on the interior portion of the generated model, corresponding to the input location R of FIG. 7, is determined as the third solution S3 of four solutions S1-S4 ordered in increasing distance from the position of the virtual camera 308. The second solution S2 corresponds to an intersection between the line L and a convex exterior portion of the surface, whereas the first and fourth solutions S1, S4 correspond to intersections between the line L and an outer surface of the degenerate toroidal primitive.

In order to view and navigate between items, it is advantageous for the user interface to be equipped with predefined operations for manipulating the user interface in response to user input.

Having rendered and displayed a projection of the model as described above, the computing system 100 may subsequently receive user input indicating a request to update the position and orientation of the virtual camera 308 relative to the model of the surface 302 (or, equivalently, update the position and orientation of the model with respect to the virtual camera 308). For example, a user may wish to rotate the model in order to view items on a different portion of the model, currently outside the user's field of view, which is equivalent to rotating the virtual camera 308 about the axis passing through the two poles. When this happens, a series of projections of the model can be rendered in real time to give the effect of smooth rotation of the surface 302, resulting in a further projection corresponding to the updated field of view of the virtual camera 308 containing an updated concave interior portion of the model. The further projection includes a further subset of the elements of the input plane 300 mapped to the updated concave interior portion of the model.

In some examples, the mapping of the positions of elements in the input plane to respective positions on the model of the surface 302 is a one-to-one mapping such that only one element in the input plane is mapped to each position on the model. In other examples, multiple elements may be mapped to a given position on the model. For example, after a full rotation of the virtual camera 308 around the model, different elements may be displayed. Selection of the elements to be rendered may depend, for example, on a number of revolutions performed during the rotation of the virtual camera 308 about the axis 303. An example is a calendar in which a temporal dimension is mapped to angles about the axis 303 and where apparent rotation of the virtual camera 308 about the axis 303 results in continuous scrolling along the temporal dimension, rather than returning to the starting point after a single rotation. A single revolution may, for example, correspond to a period of one year, one month, one week or one day.

In some examples, a request by a user to update the position, orientation, and field of view of the virtual camera 308 may indicate an input location in the display plane 312 corresponding to an objective location on the model of the surface 302. The updating of the position, orientation and field of view of the virtual camera 308, and the resulting set elements to be rendered, may then depend on the corresponding objective location. In an example, the virtual camera 308 rotates about the axis 303 until the field of view of the virtual camera 308 is laterally aligned with the objective location, providing a convenient way for the user to navigate to a particular region of the model.

In some examples, a request by a user to update the position, orientation, and field of view of the virtual camera 308 can include a request to zoom in on a given objective location on the model. The request to zoom may indicate a zoom factor. The zoom factor may be selected by a user, for example by the user holding down a button for a certain amount of time, performing a pinching action, or turning a scroll wheel by a certain amount. A zoom factor of greater than one indicates zooming towards an objective location, whereas a zoom factor of between zero and one indicates zooming away from an objective location.

It is preferable that, if the user zooms far enough towards a given objective location, the objective location appears at normal incidence at the centre of the field of view of the virtual camera 308. In this situation, a region of the model immediately surrounding the objective location appears flat, allowing the user to view the neighbourhood of the objective location without distortion. In order to achieve this, upon receiving the request to zoom, the virtual camera 308 moves along a path depending on the determined object location until the virtual camera 308 is positioned on a normal to the model at the determined objective location. The virtual camera 308 is then reoriented to face towards the determined objective location, and the dimension of the field of view of the virtual camera 308 may be decreased so that a smaller portion of the model falls within the field of view of the virtual camera 308. If further zooming is requested, the virtual camera 308 remains on the normal and the dimension of the field of view is adjusted in accordance with the requested zoom factor.

Figure 9A:
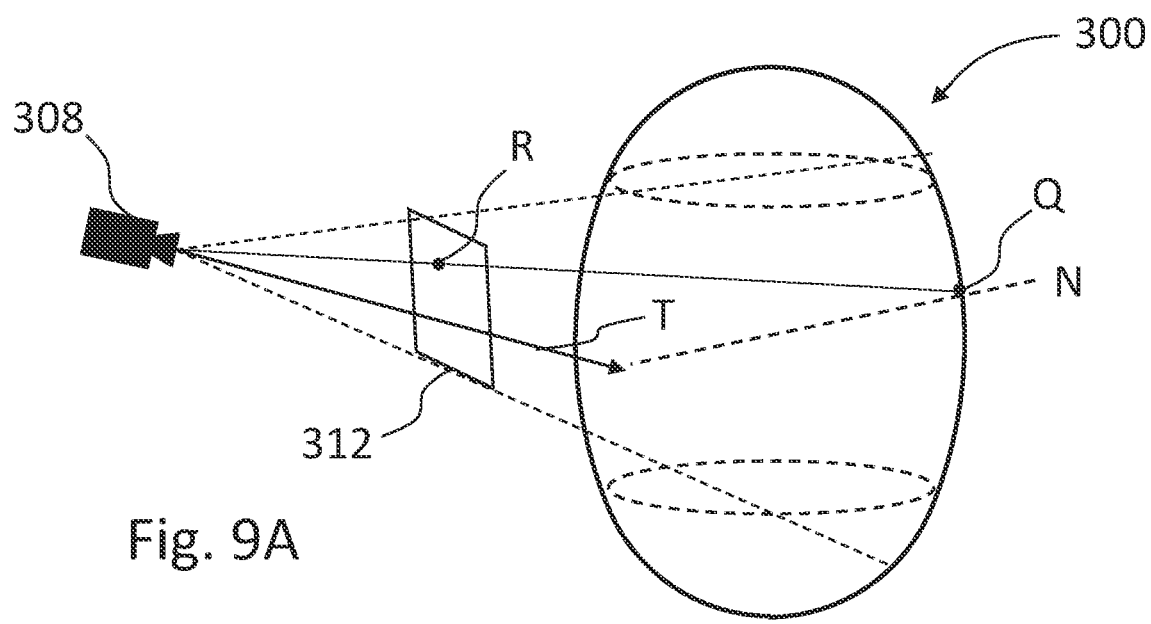
FIGS. 9A-9C show an example of actions performed by a virtual camera in response to a request to zoom.
Figure 9B:
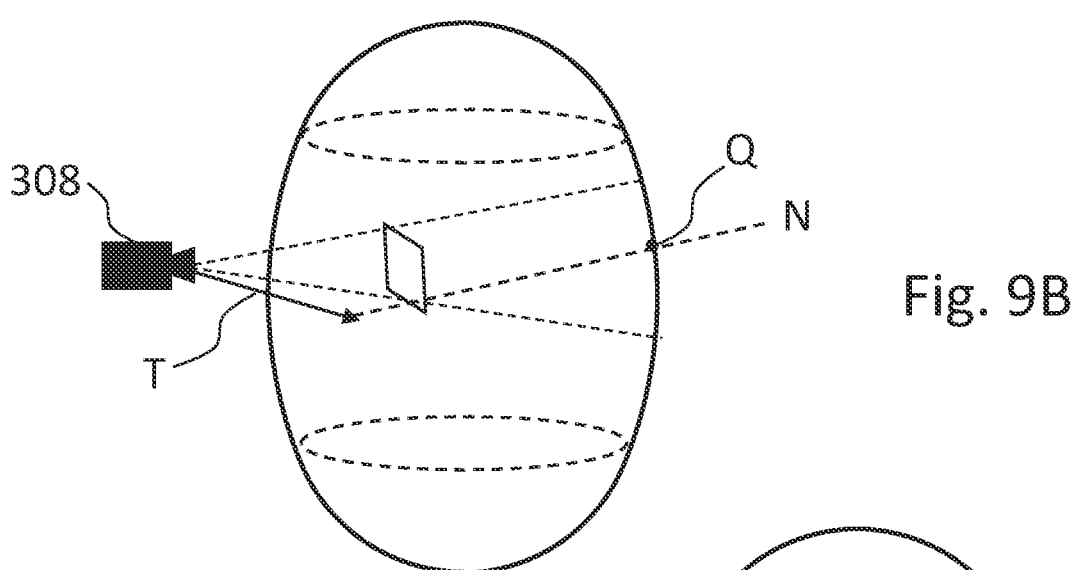
Figure 9C:
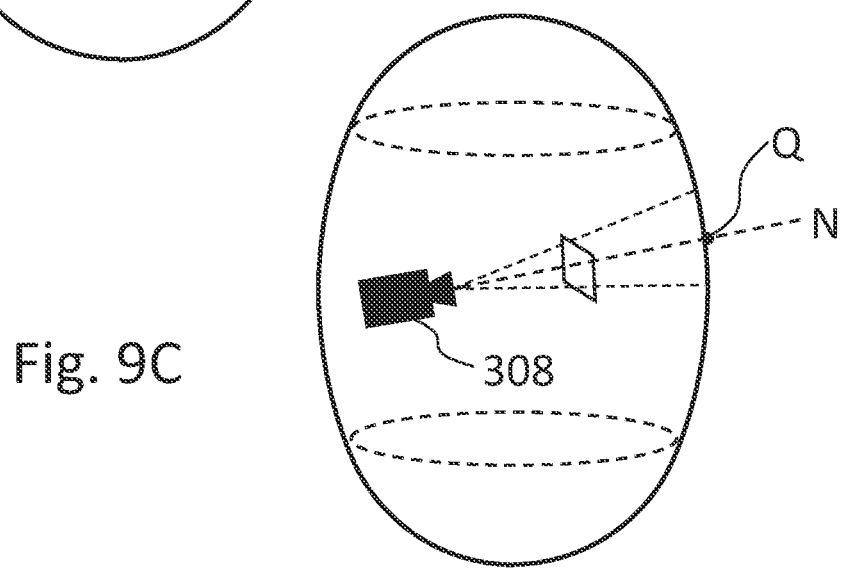

FIGS. 9A-9C show an example of operations performed by the virtual camera 308 in response to a request to zoom. In this example, the computing system 100 receives a request to zoom indicating an input location R in the display plane 312 and a zoom factor which is greater than one. The computing system 100 determines an objective location Q on the concave interior portion of the model using the intersection method described above. As shown in FIG. 9A, in this example the virtual camera 308 is not initially positioned on the normal N to the model at the objective location Q, meaning that the objective location Q appears at oblique incidence from the perspective of the virtual camera 308.

In response to the request to zoom, the virtual camera 308 moves along a trajectory T that depends on the objective location Q. In this example, the trajectory T is a straight line intersecting with the normal N at the objective location Q. The angle which the trajectory T makes with the normal N is a parameter which may be predetermined. In a further example (not shown here), the trajectory T and the normal N meet at a right angle, resulting in the shortest possible trajectory that the virtual camera 308 can follow to reach the normal N. The virtual camera 308 continues along the trajectory T for a distance determined by the requested zoom factor, and the orientation of the virtual camera 308 is adjusted towards the objective location Q. In FIG. 9B, the virtual camera 308 has moved a certain distance along the trajectory T, but is not yet positioned on the normal N. In FIG. 9C, the virtual camera 308 is positioned on the normal N. At this point, the objective location Q appears at normal incidence at the centre of the field of view of the virtual camera 308. If further zooming is requested, the dimensions of the field of view are narrowed without the virtual camera 308 being further moved or reoriented. Equipping the user interface with the zooming algorithm described above greatly improves the utility of the user interface.

A technical problem associated with the rendering of a user interface in which items are presented on a surface of a three-dimensional structure is that the computational cost of the rendering is relatively high when compared to the cost of rendering a conventional two-dimensional user interface. As the position and orientation of the camera moves with respect to the model, for example during rotating or zooming actions, real-time rendering computations are performed at a high rate in order to render a sequence of projections of the model to give a user the impression of smooth movement. The high computational cost of the rendering computations can result in lag, reducing the perceived smoothness of such actions. The issue is particularly severe when the user interface is rendered at a high resolution, as is required for applications where a large number of items is presented on the surface of the three-dimensional structure, and/or where a large number of polygons is rendered simultaneously.

In order to address the technical problem set out above, in one example obtaining the input data at 202 includes obtaining multiple of sets of image tiles, each set of image tiles comprising a set of elements of an input image rasterised at a different resolution (or, in other words, at a different level of detail) compared to that of a different set of image tiles. In some examples, the computing device 100 receives the image tiles from a remote server, whereas in other examples the computing device 100 generates the sets of image tiles locally. Each image tile includes pixel values for an array of pixels of a predetermined size, for example 128×128, 256×256 or 512×512.

Advantageously, each of the image tiles includes a relatively small number of pixels, represented by a correspondingly relatively small amount of data, that several image tiles can be simultaneously held in the cache 112 of the GPU 106.

Figure 10A:
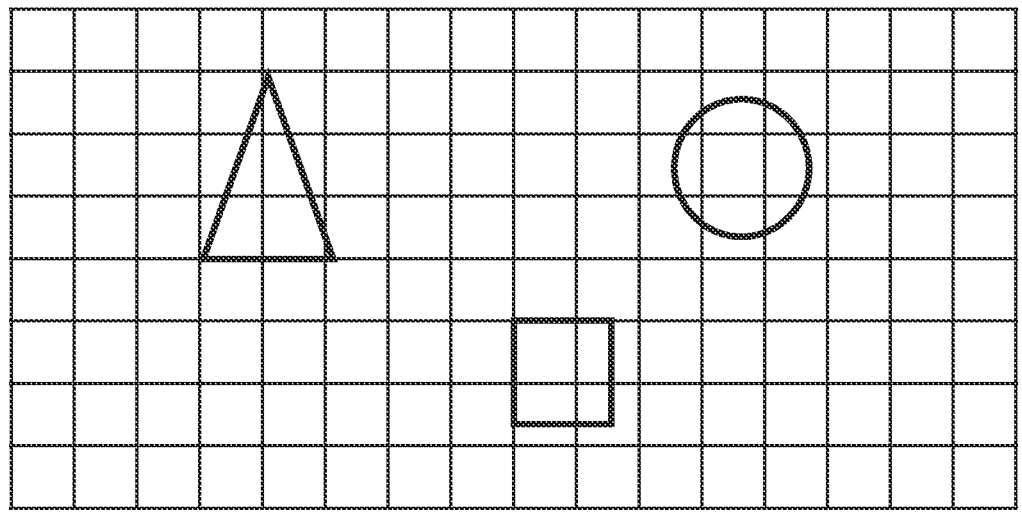
FIGS. 10A-10C show an example of an input image being split into tiles at respective different levels of detail.

In order to generate the sets of image tiles, the original input image may be split into a first set of tiles corresponding to a first resolution. FIG. 10A shows an example of an input image being split into an 8×16 grid of image tiles. In some applications, an input image may be a very high-resolution image comprising many millions or billions of pixels, which may be split into a much larger number of image tiles.

Figure 10B:
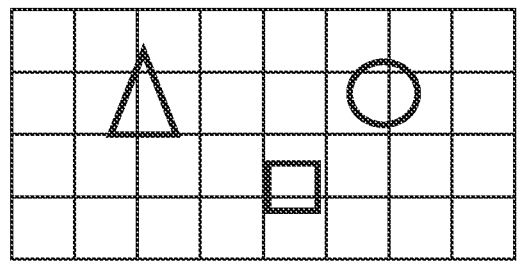
Figure 10C:
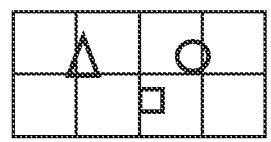

In order to generate further sets of image tiles, the input image may be resized recursively, with a new set of image tiles generated at each step of the recursion. For example, a second set of image tiles may be generated by halving the number of pixels of the input image in both dimensions (thereby reducing the area by a factor of 4). The resized image may then be split into the second set of image tiles. Each image tile of the second set generally includes the same number of pixels as each image tile in the first set, and therefore the second set of image tiles includes fewer image tiles than the first set of image tiles. The resolution of the second set of image tiles is lower than the resolution of the first set of image tiles. FIG. 10B shows the resized input image being split into a 4×8 grid of image tiles. The process of resizing and splitting is repeated, resulting in multiple sets of image tiles, each set of image tiles corresponding to the input image rasterised at a respective resolution. FIG. 10C shows a further resized input image split into a 2×4 grid of image tiles.

Having obtained the sets of image tiles, the positions of the pixels of each image tile are mapped to respective positions on the model of the surface 302. The mapping may be performed independently for each set of tiles. During rendering of the user interface, at least one of the sets of image tiles is selected in dependence on the determined field of view of the virtual camera 308. Preferably each set of tiles is selected to have a suitable resolution given the current field of view of the virtual camera 308. A suitable resolution is one that balances a need for a user to be able to view and interact with items appearing on the user interface, with a need to manage computing resources involved in the rendering process. For example, selecting a suitable resolution that avoids a slow and computationally-expensive rendering process which would otherwise cause lag. In the present example, for the default position of the virtual camera 308, the set of tiles with the lowest resolution is selected.

As explained above, image tiles from the selected set of image tiles can be loaded into the cache 112 of the GPU. In some cases, only a subset of the selected set of image tiles are loaded into the cache 112, for example those within the determined field of view of the virtual camera 308 and within a region immediately surrounding, or within a predetermined distance from, the determined field of view of the virtual camera 308. It may also be possible to load all of the image tiles of the selected set of image tiles into the cache 112.

The computing device 100 renders the projection of the model using the image tiles loaded into the cache 112, which as previously mentioned is arranged to be accessed quickly by the processing nodes 110 of the GPU 106. The rendering computations can therefore be performed with minimum delay.

When the position and orientation of the virtual camera 308 are moved in response to user input, the image tiles in the cache 112 may be replaced with image tiles corresponding to an updated portion of the surface 302. For example, when the position and orientation of the virtual camera 308 change as result of a request to zoom, the computing device 100 may determine whether a dimension of the field of view passes a predetermined threshold. If the dimension of the field of view has passed the predetermined threshold, the GPU 106 may replace the image tiles of the current set of image tiles with image tiles from a different set of image tiles. In the case of zooming towards an objective location as described above, an initial set of image tiles corresponding to an initial level of detail may be replaced with a further set of image tiles corresponding to a further, higher, level of detail. The predetermined threshold can be set such that the image tiles of the initial set are replaced before the user is able to perceive a deterioration of the image quality whilst zooming in. By including multiple sets of image tiles and associated thresholds for swapping between the different sets of image tiles, the number of image tiles, and therefore the total number of image tile pixels, rendered at any time can be kept within narrow bounds such that the user is always presented with an acceptably high level of detail, whilst the computational cost of performing processing is low enough to avoid rendering lag. The required number of sets of image tiles to achieve this balance may depend on a maximum zoom factor available to the user interacting with the user interface, or in other words the ratio of size of the maximum and minimum fields of view possible for the virtual camera 308. The inventors have found that at least three levels of details is suitable for many applications, with five levels of detail being sufficient for a maximum zoom factor of 32×.

Although in the example described above, different levels of detail are provided by different sets of image tiles including a common set of elements rasterised at different resolutions, in other examples different levels of detail may be provided with different elements, and/or different functional attributes, from one another. In this way, as the user zooms towards or away from an objective location on the model, different information may be presented, and/or different interactive functions may be accessible to the user, resulting in a multi-layer user interface structure formed of concentric surfaces between which the user can zoom. For example, where the user interface is used to present an array of objects, further information about a given object may appear as the user zooms towards that object. The further information may have associated functionality, for example being clickable or including animation effects. In an example where the user interface is used to present a hierarchical file structure, different levels in the hierarchy may be presented at different levels of detail.

Typically, the image tiles in the cache 112 are not replaced at once, and may be replaced sequentially as the GPU 106 retrieves the image tiles from the memory 102 using the DMA 108. As a result, image tiles from two different sets will sometimes be held in the cache 112 simultaneously, and accordingly image tiles at different levels of detail can be rendered simultaneously. It has been observed that when image tiles from different sets are rendered simultaneously, edge effects are sometimes noticed in which stepped black lines appear along the boundaries between adjacent image tiles. These effects are a result of the mapping of the pixels of the image tiles being mapped to the model independently for the different sets of image tiles, meaning that the mapping of the pixels does not exactly match at the boundaries. In order to avoid these effects, adjacent image tiles in a given set of image tiles can be arranged to overlap. For example, each image tile may be provided with a border comprising a few pixels of the neighbouring image tiles within the same set. Mapping the positions of the rasterised pixels of each set of image tiles then includes overlapping the generated borders of adjacent image tiles in each set of image tiles. Although the mappings may not exactly match at the boundaries, the overlapping of the tiles prevents any gaps appearing and therefore prevents the edge effects described above.

The above embodiments are to be understood as illustrative examples of the disclosure. Further embodiments are envisaged. For example, combination of surface shape and camera position could be used for rendering "surround videos" as opposed to just images. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

The invention claimed is:

1. A system comprising at least one processor and at least one memory, wherein the at least one memory comprises machine-readable instructions which, when executed by the at least one processor, cause the at least one processor to carry out operations comprising:
 obtaining input data indicative of a respective position of each of a plurality of elements within an input plane;
 generating a model of a surface of a three-dimensional structure, the surface having circular symmetry about an axis passing through two poles and comprising two curved polar caps and a curved equatorial belt connecting the two polar caps, wherein each of the curved polar caps contains a respective one of the poles and a cross-sectional curvature of each of the polar caps in a plane containing the axis is greater than a cross-sectional curvature of the equatorial belt in the plane containing the axis;
 mapping the positions of the plurality of elements within the input plane to respective positions on the generated model;
 determining a position and orientation of a virtual camera relative to the model, wherein the determined position of the virtual camera is exterior to the generated model;
 determining a field of view of the virtual camera in dependence on the determined position and orientation of the virtual camera, the field of view containing a concave interior portion of the generated model; and
 rendering, in a user interface, a projection of the generated model, the projection corresponding to the determined field of view of the virtual camera and comprising a subset of the plurality of elements mapped to positions on the concave interior portion of the generated model, wherein:
 the generated model comprises a plurality of connected polygons;
 each polygon of the plurality of connected polygons has a respective normal vector indicating an outward-facing direction of the generated model; and
 rendering the projection of the generated model comprises excluding polygons with normal vectors having a component opposite to a target direction of the camera.

2. The system of claim 1, wherein:
each of the polar caps is a surface of revolution about the axis containing the poles of a circular arc with a first radius, and the equatorial belt of the surface is a surface of revolution about the axis containing the poles of a circular arc with a second radius, wherein the second radius is greater than the first radius.

3. The system of claim 1, wherein:
the determined orientation of the virtual camera is such that the two poles comprise an upper pole and a lower pole with respect to the determined orientation; and
the determined position of the virtual camera is closer to the upper pole than to the lower pole.

4. The system of claim 1, wherein the input data further associates functional attributes with at least a portion of the plurality of elements, the method further comprising:
receiving user input indicating an input location in the user interface;
determining an interaction location on the concave interior portion of the generated model corresponding to the indicated input location in the user interface; and
performing a processing routine in accordance with a functional attribute of an element mapped to the determined interaction location on the generated model.

5. The system of claim 4, wherein determining the interaction location on the concave interior portion of the generated model comprises:
determining parameters of a line passing through the virtual camera in a direction dependent on the indicated input location;
determining an interaction location on the concave interior portion of the generated model as an intersection between said line and the surface.

6. The system of claim 5, wherein:
each of the polar caps is a surface of revolution about the axis containing the poles of a circular arc with a first radius, and the equatorial belt of the surface is a surface of revolution about the axis containing the poles of a circular arc with a second radius, wherein the second radius is greater than the first radius and
determining the interaction location comprises determining the interaction location as one of four intersections between said line and a degenerate toroidal surface comprising the equatorial belt.

7. The system of claim 1, wherein said concave interior portion is a first concave interior portion, said projection is a first projection, said subset of the plurality of elements is a first subset, the operations further comprising:
receiving user input;
updating the position, orientation, and field of view of the virtual camera in dependence on the received user input; and
rendering, in the user interface, a second projection of the generated model, the second projection corresponding to the updated field of view of the virtual camera and comprising a second subset of the plurality of elements mapped to positions on a second concave interior portion of the generated model.

8. The system of claim 7, wherein:
updating the position and orientation of the virtual camera comprises rotating the virtual camera about the axis passing through the two poles; and
the second subset of the plurality of elements depends on a number of revolutions performed during the rotation of the virtual camera about the axis.

9. The system of claim 7, wherein:
the received user input indicates an input location in the user interface; and
updating the position, orientation, and field of view of the virtual camera comprises:
determining an objective location on the concave interior portion of the model corresponding to the indicated input location in the user interface; and
updating the position, orientation, and field of view of the virtual camera in dependence on the determined objective location.

10. The system of claim 9, wherein determining the objective location on the concave interior portion of the model comprises:
determining parameters of a line passing through the virtual camera in a direction depending on the indicated input location; and
determining the objective location as an intersection between the line and the surface.

11. The system of claim 9, wherein:
the received user input indicates a zoom factor; and
updating the position, orientation, and field of view of the virtual camera comprises:
moving the virtual camera along a path depending on the determined objective location until the virtual camera is positioned on a normal to the generated model at the determined objective location;
orienting the virtual camera to face towards the determined objective location; and
adjusting a dimension of the field of view of the virtual camera in dependence on the indicated zoom factor.

12. The system of claim 1, wherein:
obtaining the input data comprises obtaining a plurality of sets of image tiles, each set of image tiles comprising an input image rasterised at a respective level of detail;
mapping the positions of the plurality of elements comprises mapping the positions of the rasterised elements of each set of image tiles to respective positions on the model; and
rendering said projection of the generated model comprises:
selecting one or more of the generated sets of image tiles in dependence on the determined field of view of the virtual camera;
loading image tiles of said one or more of the generated sets of image tiles into a cache; and
rendering said projection of the generated model using the tiles loaded into the cache.

13. The system of claim 12, wherein obtaining the plurality of image tiles comprises:
generating a plurality of copies of the input image scaled by respective different scale factors; and
splitting each of the generated scaled copies of the input image into a respective one of the sets of image tiles.

14. The system of claim 12, wherein:
generating each set of image tiles comprises generating overlapping image tiles; and
mapping the positions of the rasterised elements of each set of image tiles to respective positions on the generated model includes overlapping the generated borders of adjacent image tiles in each set of image tiles.

15. The system of claim 12, wherein determining the objective location on concave interior portion of the model comprises:
determining parameters of a line passing through the virtual camera in a direction depending on the indicated input location; and determining the objective location as an intersection between the line and the surface, wherein the operations further comprise:

determining that the adjusted dimension of the field of view has passed a predetermined threshold; and replacing, in the cache, the image tiles of said one or more of the generated sets of image tiles with image tiles from a different one or more of the generated set of image tiles, in response to the determining that the adjusted dimension of the field of view has passed the predetermined threshold.

16. The system of claim 12, where the input data associates different functional attributes to at least a portion of the plurality of elements for the respective different levels of detail.

17. The system of claim 1, further comprising a display, the operations further comprising displaying the user interface on the display.

18. A computer-implemented method comprising, using one or more processors:

obtaining input data indicative of a respective position of each of a plurality of elements within an input plane, the input data associating functional attributes with at least a portion of the plurality of elements;

generating a model of a surface of a three-dimensional structure, the surface having circular symmetry about an axis passing through two poles and comprising two curved polar caps and a curved equatorial belt connecting the two polar caps, wherein each of the curved polar caps contains a respective one of the poles and a cross-sectional curvature of each of the polar caps in a plane containing the axis is greater than a cross-sectional curvature of the equatorial belt in the plane containing the axis;

mapping the positions of the plurality of elements within the input plane to respective positions on the generated model;

determining a position and orientation of a virtual camera relative to the generated model, wherein the determined position of the virtual camera is exterior to the generated model;

determining a field of view of the virtual camera in dependence on the determined position and orientation of the virtual camera, the field of view containing a concave interior portion of the model; and rendering, in the user interface, a projection of the generated model, the projection corresponding to the determined field of view of the virtual camera and comprising a subset of the plurality of elements mapped to positions on the concave interior portion of the generated model, wherein:

the generated model comprises a plurality of connected polygons;

each polygon of the plurality of connected polygons has a respective normal vector indicating an outward-facing direction of the generated model; and rendering the projection of the generated model comprises excluding polygons with normal vectors having a component opposite to a target direction of the camera.

19. A non-transient storage medium comprising machine-readable instructions which, when executed by at least one processor, cause the at least one process to perform operations comprising:

obtaining input data indicative of a respective position of each of a plurality of elements within an input plane, the input data associating functional attributes with at least a portion of the plurality of elements;

generating a model of a surface of a three-dimensional structure, the surface having circular symmetry about an axis passing through two poles and comprising two curved polar caps and a curved equatorial belt connecting the two polar caps, wherein each of the curved polar caps contains a respective one of the poles and a cross-sectional curvature of each of the polar caps in a plane containing the axis is greater than a cross-sectional curvature of the equatorial belt in the plane containing the axis;

mapping the positions of the plurality of elements within the input plane to respective positions on the generated model;

determining a position and orientation of a virtual camera relative to the generated model, wherein the determined position of the virtual camera is exterior to the generated model;

determining a field of view of the virtual camera in dependence on the determined position and orientation of the virtual camera, the field of view containing a concave interior portion of the model; and rendering, in the user interface, a projection of the generated model, the projection corresponding to the determined field of view of the virtual camera and comprising a subset of the plurality of elements mapped to positions on the concave interior portion of the generated model, wherein:

the generated model comprises a plurality of connected polygons;

each polygon of the plurality of connected polygons has a respective normal vector indicating an outward-facing direction of the generated model; and rendering the projection of the generated model comprises excluding polygons with normal vectors having a component opposite to a target direction of the camera.

* * * * *